United States Patent [19]

Bryce

[11] Patent Number: 4,964,307
[45] Date of Patent: Oct. 23, 1990

[54] LIQUID FLOW MEASURING DEVICE

[76] Inventor: Rod H. Bryce, 150, 53rd Avenue, Lachine Quebec, Canada, H8T 2Z1

[21] Appl. No.: 229,422

[22] Filed: Aug. 8, 1988

[51] Int. Cl.⁵ ................................................ G01F 1/00
[52] U.S. Cl. .......................................... 73/861; 73/223
[58] Field of Search ....................... 73/3, 223, 861, 224

[56] References Cited

U.S. PATENT DOCUMENTS

| | | | |
|---|---|---|---|
| 405,885 | 6/1889 | Hart . | |
| 2,101,257 | 12/1937 | Vogel-Jorgensen | 73/223 |
| 2,626,385 | 1/1953 | Schumann | 73/223 |
| 2,994,221 | 8/1961 | Taylor | 73/113 |
| 3,000,207 | 9/1961 | Goffe | 73/113 |
| 3,044,574 | 7/1962 | Ferguson | 184/55 |
| 3,053,343 | 9/1962 | Hornbostel | 184/96 |
| 3,125,881 | 3/1964 | Peters et al. | 73/223 |
| 3,234,784 | 2/1966 | Wiegmann | 73/223 |
| 3,415,118 | 12/1968 | McQueen et al. | 73/199 |
| 4,253,332 | 3/1981 | Sabatino et al. | 73/224 |
| 4,364,269 | 12/1982 | Kennerly et al. | 73/223 |

FOREIGN PATENT DOCUMENTS

| | | |
|---|---|---|
| 712878 | 7/1965 | Canada . |
| 713898 | 7/1965 | Canada . |
| 720621 | 11/1965 | Canada . |
| 964735 | 7/1964 | United Kingdom ................. 73/223 |
| 1525713 | 9/1978 | United Kingdom ................. 73/223 |

Primary Examiner—Herbert Goldstein
Attorney, Agent, or Firm—Featherstonhaugh & Co.

[57] ABSTRACT

A liquid flow measuring device for lubrication systems and the like allows liquid flow measurement to be made with a minimum interruption of liquid flow and no dismantling of lubricant pipes to lubricated elements. The measuring device comprises a container body having a liquid inlet and a liquid outlet for discharging from a lower portion of the body to an outlet line, the body having a transparent side such that liquid level within the container body is visible with a low level mark and a high level mark. The liquid is temporarily prevented from discharging from the outlet of the body, but the liquid is allowed to flow through the inlet of the body so the liquid level rises from the low level mark to the high level mark.

8 Claims, 4 Drawing Sheets

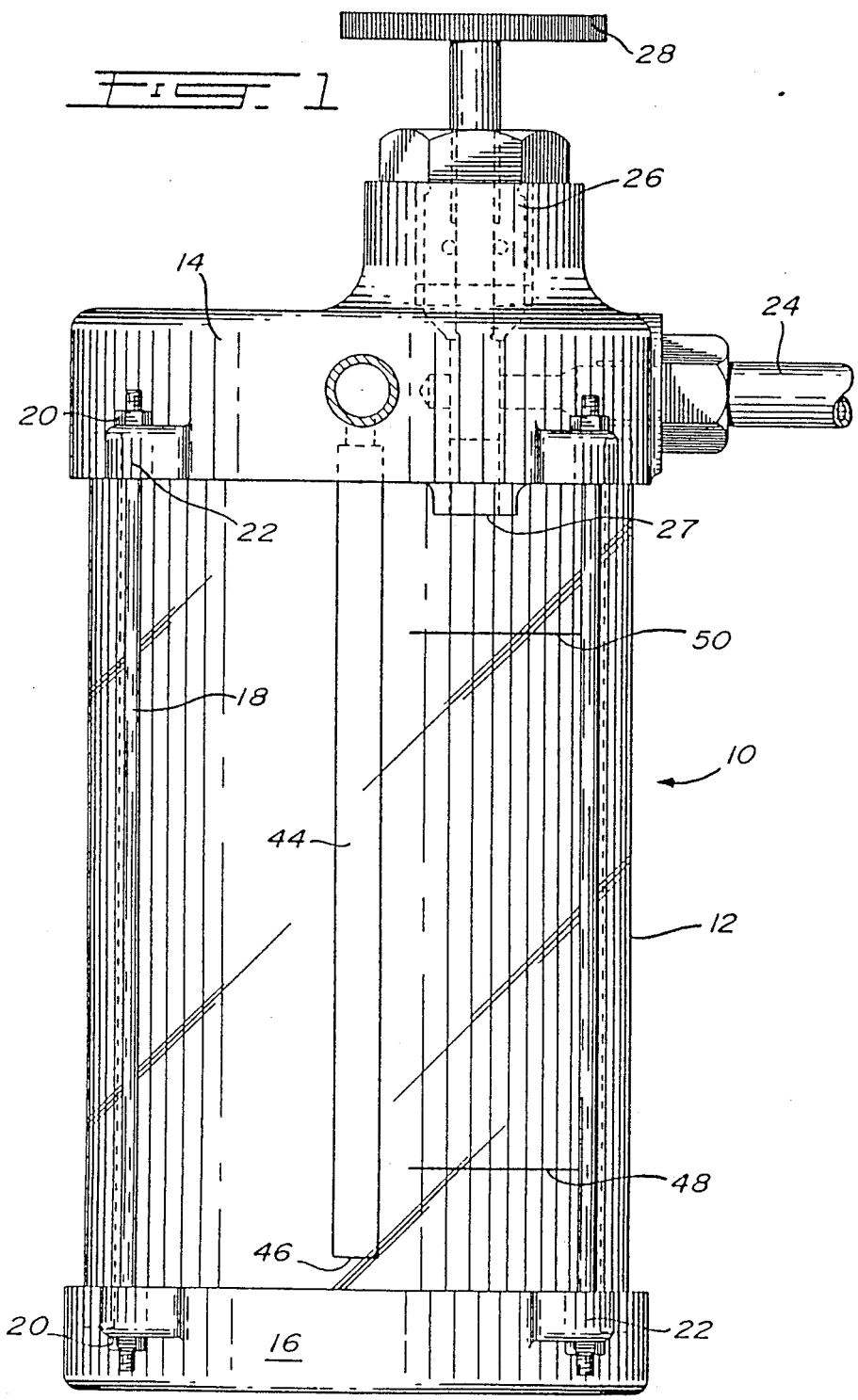

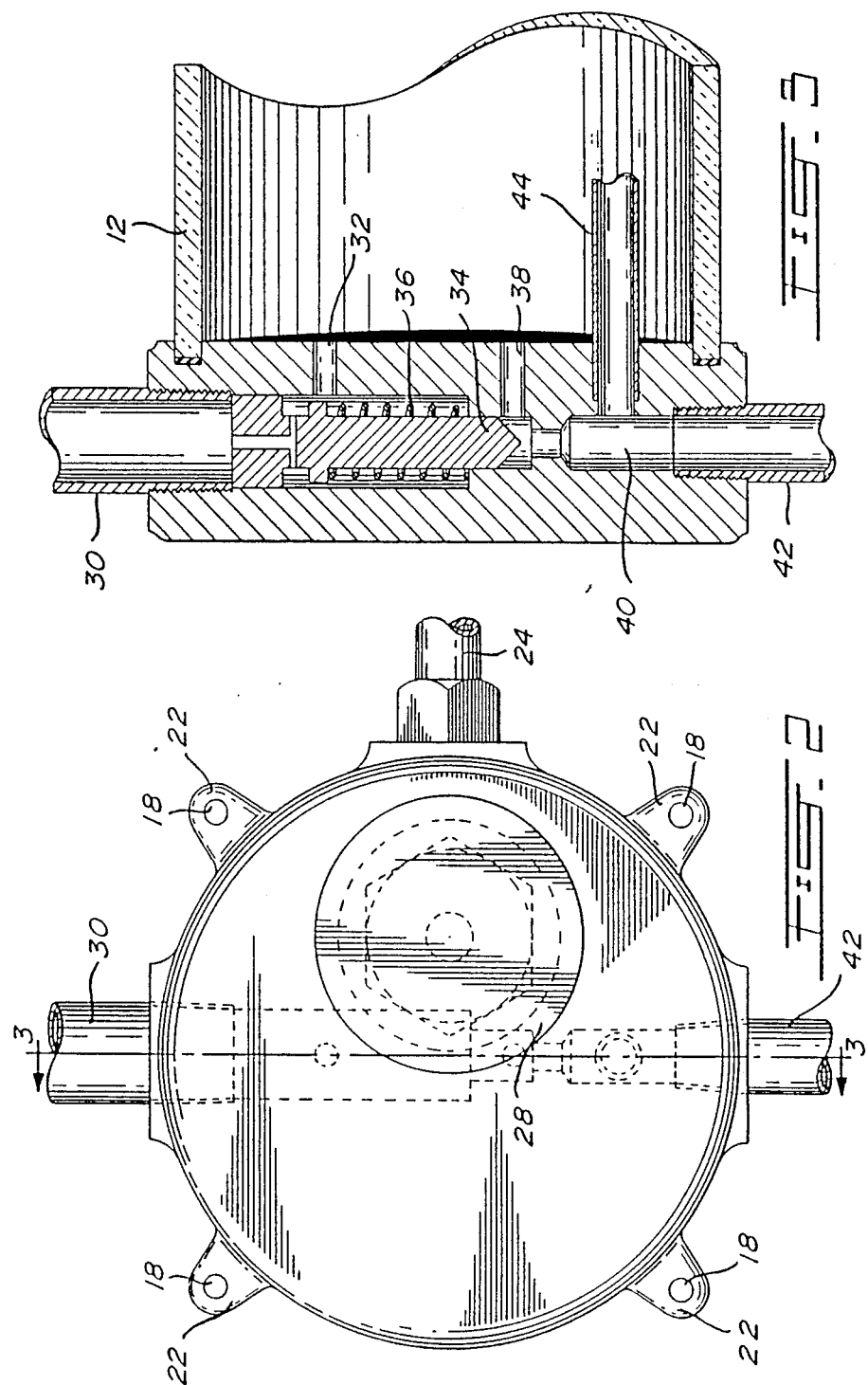

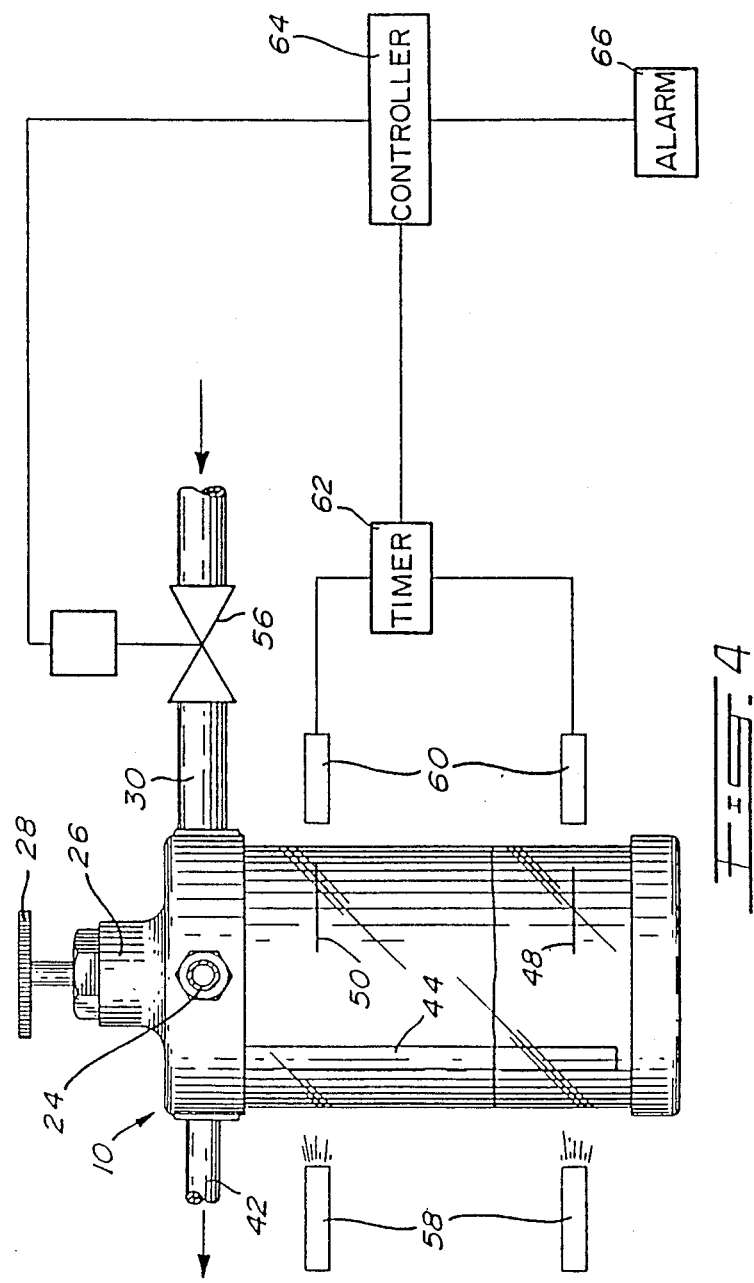

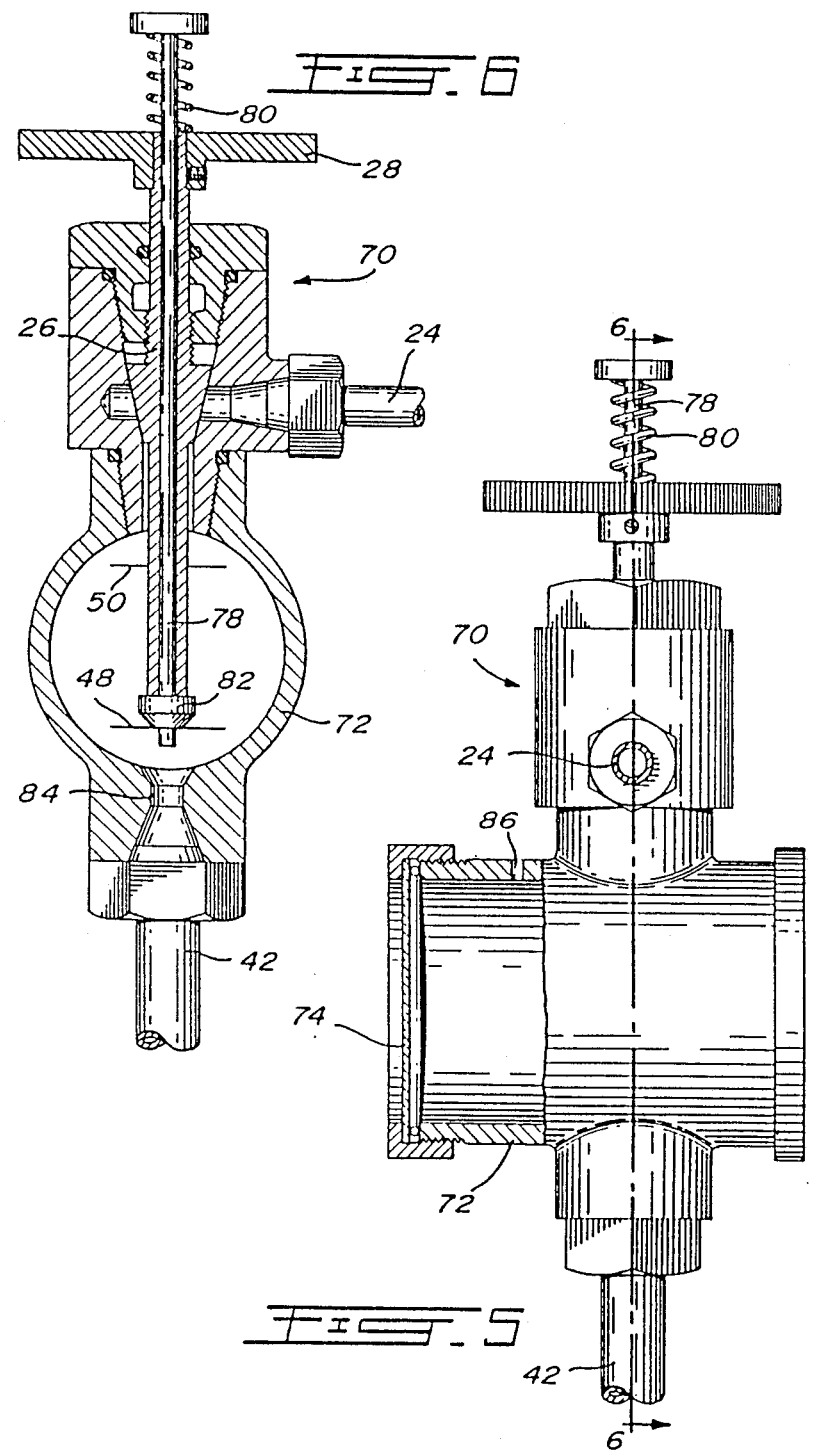

LIQUID FLOW MEASURING DEVICE

The present invention relates to liquid flow measurement and more specifically to both gravity and pressure feed lubrication systems including a device for measuring lubricant flow.

Lubrication of paper machines and other large machines is accomplished with strategically located lubricators each connected to lubricant lines. Flow of lubricant is generally controlled by means of a throttle valve and visual indicators are provided at different positions in the lubricant lines to enable operators to ensure lubricant is flowing. If lubricant flow to lubricated elements of a large machine is stopped or substantially reduced, bearings or gears can become seriously damaged causing shut downs. In some lubricating systems, oil flows from a throttle valve to a lubricated element by gravity. In other systems oil flowing from the throttle valve to the lubricated element is under pressure. In one type of pressurized system, a stream of lubricant is made visible by letting compressed air into a lubricating device to evacuate the lubricant from a sight glass located on the exit side of a throttle valve. Once the compressed air is turned off, the visible stream of lubricant may be seen. This visible stream is useful to indicate that oil is flowing, but does not give an indication of the quantity of lubricant flowing with sufficient accuracy to be acceptable for lubricating many machines.

In another type of pressure lubrication system, some lubricant feeders attempt to show the flow of lubricant by the position of a ball in a transparent tube. The ball is pushed against the lubricant flow by a spring. Alternatively, the flow measurement is determined by the position of a ball in a conical transparent tube. In yet a further embodiment paddles or lobes actuated by lubricant flow are caused to rotate at a speed proportional to the flow. These designs generally all have a throttle valve to meter and maintain the flow of lubricant to the lubricators.

It has been found that over an extended period of time throttle valves become plugged because of dirt and other matter in the lubricant and/or the flow of lubricant through the throttle valves varies with changes in lubricant viscosity caused by changes in lubricant temperature.

One problem that exists with these type of flow measuring devices is that they tend to "hang up" and not show the true flow quantity. This is particularly true in cases where dirt particles cause a partial clog.

A further problem is the calibration of flow measurement devices on lubrication systems. Calibration of known devices is primarily done by disconnecting the pipe at the entry to the lubricated elements and allowing the lubricant to flow into a container of known volume. A measurement of the time required to fill up the container allows the actual flow rate to be calculated. This has the disadvantage of being time consuming and extremely difficult, if not impossible to do during operation of a machine because of high temperatures or environmental problems. Also disconnecting the lubricant pipe can substantially change the back pressure on the throttle valve, which changes the flow through the valve at a specific setting.

It is an aim of the present invention to provide a lubricating device for paper machines and other large equipment that is completely dependable and ensures that the flow of lubricant through the device can be monitored at regular intervals without having to disconnect any lubricant lines.

The present invention provides a liquid flow measuring device for a lubrication system which allows an operator to ensure that lubrication is flowing to the lubricated elements and determine the lubricant flow rate to the lubricators without disturbing the back pressure on the throttle valve or without disconnecting any lubricant pipes. The flow rate can be measured at any time so that problems with plugging, lubricant viscosity changes etc. can be discovered and corrected before they cause damage to the equipment.

According to one broad aspect of the present invention, there is provided a liquid flow measuring device comprising:

a container body for liquid having a transparent side such that liquid level within the container body is visible with a low level mark and a high level mark;

a liquid inlet for said container;

a first liquid outlet for discharging from a lower portion of the container body to an outlet line, said first outlet having a port below the low level mark;

a second liquid outlet at the top of the container body connecting to said outlet line;

valve means for said outlet line, said valve means being moveable between a first position, in which said second liquid outlet is open, and a second position, in which said second liquid outlet is closed;

means for biasing said valve means toward said first position;

a compressed air inlet communicating with said valve means with an air outlet communicating with said container, said valve means is structured to move to said second position upon compressed air being admitted into said compressed air inlet;

whereby said valve means is moved to said second position by admitting compressed air into said air inlet, said compressed air flowing into said container via said air outlet and forcing fluid out of said container via said first liquid outlet until said fluid level is below said low level mark, after which said supply of compressed air is arrested to allow said valve means to return to said first position so that said container can refill with said fluid.

In one embodiment a pressure feed device, which operates by introducing compressed air to the container body, evacuates the liquid by momentarily increasing the liquid discharge through the outlet line. The liquid flow rate is then determined by measuring the time it takes for the liquid level to rise from the low level mark to the high level mark. The volume of liquid in the container body between the two marks is known so the flow rate can be calculated.

In a gravity feed device, the container body does not have to be evacuated as it is normally empty during operation. The flow rate is measured by shutting off the liquid to the outlet line and measuring the time required for the liquid level to rise from the low level mark to the high level mark.

The time required for the interruption of liquid discharged to the outlet line is dependent upon the flow rate, but it is not likely that an interruption of up to thirty seconds would be harmful for most lubrication applications. Longer or shorter interruption times may be permitted dependent upon the size of the container body and the equipment to be lubricated.

The measuring device of the present invention may also be used automatically with a lubrication system. The introduction of compressed air to the container body is controlled by an electrically operated valve which evacuates the liquid from the container body, and level sensing devices are provided at the low level mark and the high level mark so that the time for the liquid level to rise from the low level mark to the high level mark can be measured. Deviations from a prescribed time range can initiate an alarm system or, in another embodiment, change a throttle valve opening of the liquid supply to the container body.

The introduction of compressed air to the measuring devices may be by individual valves for each device, or one valve supplying compressed air to an air header which is connected to several measuring devices for lubrication systems. Restrictive orifices or other throttling devices may be used to balance the air flow to each lubricated element.

In drawings which illustrate embodiments of the invention:

FIG. 1 is a side view of a pressure feed liquid flow measuring device according to one embodiment of the present invention;

FIG. 2 is a top view of the liquid flow measuring device shown in FIG. 1;

FIG. 3 is a sectional view taken at line 3—3 of FIG. 2;

FIG. 4 is a schematic diagram of an automatic monitoring system wherein the liquid flow to an outlet line is monitored at predetermined intervals;

FIG. 5 is a side sectional view of a gravity feed liquid flow measuring device according to another embodiment of the present invention;

FIG. 6 is a sectional view taken at line 6—6 of FIG. 5;

A liquid flow measuring device 10 for a pressure feed lubrication system is shown in FIGS. 1 to 3 wherein a cylindrical container body 12 made of transparent material, such as glass or plastic, fits between a top portion 14 and a bottom portion 16 held together by rods 18 having nuts 20 at each end. As can be seen in FIG. 2, the rods 18 pass through lugs 22 which extend out from the circular shaped top portion 14 and bottom portion 16. Seals (not shown) are provided at the top and bottom of the cylindrical body 12 so that no leaking occurs at the joints between the body 12 and the top and bottom portions 14 and 16.

A lubricant supply line 24 enters the top portion 14 and passes through a throttle valve 26 which controls the flow of liquid through a lubricant entry port 27 into the container 12. A rotatable handle 28 allows the throttle valve 26 to be controlled to vary the flow of liquid.

As shown in more detail in FIG. 3, a compressed air line 30 enters the top portion 14 substantially at right angles to the lubrication supply line 24 and has an aperture 32 to permit compressed air to enter the container 12. When the compressed air is turned on, a plunger 34 is pushed forward compressing a coil spring 36 to close a top outlet port 38. This top outlet port 38 permits liquid to discharge from the container 12 through orifice 40 leading to the liquid outlet line 42. A vertical pipe 44 extends down from the orifice 40 in the top portion, in the container body 12 to a bottom outlet port 46 positioned just above the lower portion 16.

The container body 12 has a low level mark 48 on the transparent surface. The low level mark 48 is positioned above the bottom outlet port 46 of the vertical pipe 44. Furthermore, at the top of the container body 12 is a high level mark 50. The high level mark 50 may be calibrated with a series of marks indicating a liquid measurement such as liters. The flow quantity can be measured by using a fixed time, i.e. 10 seconds, and viewing the level the oil reaches within the fixed time.

During normal operation, no compressed air is supplied through the compressed air line 30. Oil or other lubricant liquid flows through the supply line 24 and the throttle valve 26 entering the container body 12 at the entry port 27. The liquid fills up the container body 12, enters the orifice 40 through the top outlet port 38 and the bottom outlet port 46, discharging through to the outlet line 42. Thus the container body 12 in normal operation is always full of liquid. In order to measure the flow rate of liquid to the outlet line 42, compressed air is supplied through the compressed air line 30, by a valve (not shown) which pushes the plunger 34 to close the top outlet port 38 and at the same time forces air through the aperture 32 into the container body 12. The compressed air forces the liquid in the container body 12 out through bottom outlet port 46 up the vertical pipe 44 through the orifice 40 into the outlet line 42 until the level of the liquid in the container body 12 is below the low level mark 48. The compressed air is then turned off and as the container body 12 slowly fills up, the time period for the liquid level to rise from the low level mark 48 to the high level mark 50 is measured. The volume of the container between the two marks 48 and 50 is known, thus a simple calculation provides the flow rate of liquid into the container body 12. Throughout the flow rate measurement test, liquid is not discharged through the outlet line 42, but this recommences immediately the container body 12 is full.

The liquid flow measuring device of the present invention may be operated automatically and one example of an automatic operation is shown in FIG. 4 wherein a solenoid valve 56 is located on the compressed air line 30. Two light sources 58 are positioned on one side of the container body 12 opposite the low level mark 48 and the high level mark 50. Optical light sensors 60 are provided on the other side of the container body 12 opposite the light sources 58 such that when the liquid level within the container body 12 rises from the low level mark 48 to the high level mark 50, a signal is sent to a timer 62. Everytime a test is required, a controller 64 activates the solenoid valve 56 so that compressed air pushes the liquid level down. A light sensor 60 at the low level mark 48 determines when the liquid level is below the low level mark 40 and the compressed air is turned off. The time period for the liquid level to rise from the low level mark 48 to the high level mark 50 is measured by the light sensors 60 and the timer 62. A signal representing this time period is sent to the controller 64. If this time period is beyond a preset period, then a signal is provided to an alarm 66 which may be a sound alarm or a visual alarm. In another embodiment a signal from the controller 66 may be sent to an electrically operated throttle valve 26 which adjusts the valve opening to either open or close the liquid supply line 24 and in this way the flow of liquid through the liquid flow measuring device is controlled.

The system shown in FIG. 4 can be arranged to operate completely automatically at preset time periods. A display, electronic or other, may be provided either locally or in a control area so that the flow of liquid is indicated on a panel and is updated at set times. The compressed air supply as shown in FIG. 4 has one solenoid valve 56 for one liquid flow measuring device 10, however, an air header may be provided having a single valve therein which is connected to several measuring devices.

FIGS. 5 and 6 illustrate a gravity feed measuring device 70 with a cast metal or plastic container body 72 and a sight glass 74 having a low level mark 48 and a high level mark 50 shown thereon. A lubricant supply line 24 enters at the top of the container body 72 and has a throttle valve 26 controlled by a rotatable handle 28 to vary the flow of liquid into the container body 72, air within the container body escapes through vent 86. Outlet line 42 is at the bottom of the container body 72 so that in normal operation, liquid flows in at the top of the container body 72 and straight out through the outlet line 42. The liquid does not remain in the container body during normal operation.

A plunger 78 with a compression spring 80 thereon extends down through the throttle valve 26 and the container body 12. A plug 82 at the bottom of the plunger 78 fits into a valve seat 84 at the discharge port to the outlet line 42.

When the plunger 78 is pushed down, it compresses the spring 80 and the plug 82 seals on the valve seat 84 so that the liquid level rises within the container body 72. The time period is measured for the liquid level to rise from the low level mark 48 to the high level mark 50. The soon as an operator's finger or hand is removed from the plunger 78, the spring 80 pushes the plunger 78 upwards thus opening the discharge port and ensuring it remains open. Thus the restriction of liquid flowing through the outlet line 42 is minimum.

Preferred embodiments of the invention are illustrated by way of examples. It is to be expressly understood that the description and drawings are only for the purpose of illustration and as an aid to understanding, and are not intended as a definition of the limits of the invention.

The embodiments of the invention in which an exclusive property or privilege is claimed are defined as follows.

1. A liquid flow measuring device comprising:
   a container body for liquid having a transparent side such that liquid level within the container body is visible with a low level mark and a high level mark;
   a liquid inlet for said container;
   a first liquid outlet for discharging from a lower portion of the container body to an outlet line, said first outlet having a port below the low level mark;
   a second liquid outlet at the top of the container body connecting to said outlet line;
   valve means for said outlet line, said valve means being moveable between a first position, in which said second liquid outlet is open, and a second position, in which said second liquid outlet is closed;
   means for biasing said valve means toward said first position;
   a compressed air inlet communicating with said valve means with an air outlet communicating with said container, said valve means is structured to move to said second position upon compressed air being admitted into said compressed air inlet;
   whereby said valve means is moved to said second position by admitting compressed air into said air inlet, said compressed air flowing into said container via said air outlet and forcing fluid out of said container via said first liquid outlet until said fluid level is below said low level mark, after which said supply of compressed air is arrested to allow said valve means to return to said first position so that said container can refill with said fluid.

2. The liquid flow measuring device according to claim 1 wherein the outlet line extends from the top of the container body, and the first liquid outlet from the lower portion of the container body extends down from the outlet line to the port below the low level mark.

3. The liquid flow measuring device according to claim 1 wherein said valve means and biasing means therefor comprise a spring loaded plunger which when pressurized closes the second liquid outlet at the top of the container body.

4. The liquid flow measuring device according to claim 1 including a controller adapted to supply the compressed air for a time sufficient to force the liquid in the container body out through the liquid outlet until the liquid level is below the low level mark, first level sensing means positioned at the low level mark, second level sensing means positioned at the high level mark, and timing means to time the liquid level rise from the low level mark to the high level mark.

5. The liquid flow measuring device according to claim 4 including an alarm means activated by the controller if the time for the liquid level rise from the low level mark to the high level mark is above or below preset time periods.

6. The liquid flow measuring device according to claim 1, wherein a flow adjustment means is provided for the liquid inlet.

7. A method of measuring rate of liquid flow through a measuring device, comprising the steps of:
   feeding liquid to an inlet of a container body, the container body having at least one transparent side such that liquid level within the container body is visible with a low level mark and a high level mark, the container body having a first outlet for discharging liquid from a lower portion of the container body to an outlet line, said first outlet having a port below the low level mark, the container body having a second outlet at the top of the container body connecting to said outlet line;
   forcing the liquid out of the container body through said first outlet by closing the said second outlet and allowing compressed air into the container body so the liquid level is below the low level mark on the container body;
   arresting the supply of compressed air into the container body and measuring the time period for the liquid level to rise from the low level mark to the high level mark; and
   correlating the measured time period to give an indication of flow rate.

8. A method of measuring rate of liquid flow through a measuring device according to claim 7 including the steps of:
   monitoring the time period for the liquid level to rise from the low level mark to the high level mark utilizing level detector sensing means, and
   producing an alarm signal if the time period is above or below preset time periods.

* * * * *